United States Patent [19]

Kinoshita

[11] Patent Number: 4,522,321
[45] Date of Patent: Jun. 11, 1985

[54] GATE DRIVING DEVICE

[75] Inventor: Kinjiro Kinoshita, Himeji, Japan

[73] Assignee: Yamato Scale Company, Limited, Hyogo, Japan

[21] Appl. No.: 537,036

[22] Filed: Sep. 29, 1983

[30] Foreign Application Priority Data

Oct. 5, 1982 [JP] Japan .................. 57-175457

[51] Int. Cl.$^3$ ............................................. F16K 31/52
[52] U.S. Cl. ...................................... 222/504; 177/25
[58] Field of Search ................... 222/504, 505, 556; 251/228, 300, 303; 74/42, 43, 47, 51; 177/25

[56] References Cited

U.S. PATENT DOCUMENTS 2,610,749  9/1952  Somogyi .................. 251/229 X
4,344,492  8/1982  Hirano ......................... 177/25

FOREIGN PATENT DOCUMENTS 149059  5/1974  Japan .

Primary Examiner—Stanley H. Tollberg
Attorney, Agent, or Firm—Senniger, Powers, Leavitt and Roedel

[57] ABSTRACT

An improved gate driving link mechanism is provided, this mechanism being originally designed for opening and closing a flapdoor type discharge gate of a weighing hopper of top-charge and bottom discharge type, used in a combination weighing device such as disclosed in U.S. Pat. No. 4,344,492, the improvement of which is to add an intermediate bell crank for confining overshoot of the opened gate to avoid unwanted time loss which affect high speed operation of the device and undesirable shock and vibration which affects accuracy of measurement.

4 Claims, 6 Drawing Figures

GATE DRIVING DEVICE

This invention relates to an improved gate driving device which is used for opening and closing a flapdoor type discharge gate of a weighing cradle or hopper of the "bottom-discharge" type, which is especially useful in an automatic weighing device.

U.S. Pat. No. 4,344,492 discloses a combination weighing machine including a plurality of weighing units each having an automatically loaded and unloaded weighing cradle or hopper. This weighing hopper is of the "bottom-discharge" type and has a flapdoor type discharge gate at its bottom opening. This gate is generally driven by means of link-and-crank mechanism, such as shown in the opened Japanese utility model specification No. 50-149059. However, such prior art mechanisms have suffered from a problem of overshoot which involves unwanted time loss in operation which affects high speed operation of the device and also gives undesirable shock and vibration to the weighing unit to reduce its accuracy of measurement.

Accordingly, an object of this invention is to remove the above problem and provide an improved mechanism for driving such a gate without unwanted overshoot.

According to this invention, provided is a mechanism for driving a flapdoor type discharge gate pivoted on a horizontal axis at a bottom opening of a hopper, which includes first and second bell cranks pivoted on separate horizontal axes which are parallel to the axis of the gate, and having first and second arms, respectively. The first arm of the first bell crank is provided for receiving a driving force from the outside and its second arm is coupled through a connecting rod to the first arm of the second bell crank. The second arm of the second bell crank is coupled through another connecting rod to the gate, so that rotational actuation of the first bell crank results in rotational movement of the gate. As a feature of this invention, the locations and geometries of the bell cranks and connecting rods are designed such that the second arm of the first bell crank and the first connecting rod lie on a straight line when the gate is closed and the second arm of the second bell crank and the second connecting rod lie on another straight line when the gate is opened.

These and other objects and features of this invention will be described in more detail hereinunder with reference to the accompanying drawings.

In the drawings.

Throughout the drawings, the same reference numerals are given to like structural components.

Figure 1:
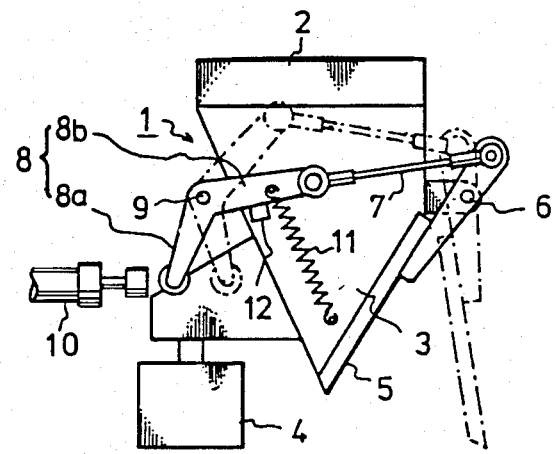
FIG. 1 is a side view representing a conventional gate driving device according to the prior art.

Referring to FIG. 1, a prior art weighing hopper 1 has an entrance opening 2 at its top and an exit opening 3 at its bottom. The hopper 1 is mounted on a weighing unit 4 for weighing product or articles charged in the hopper 1. The exit opening 3 of the hopper 1 lies on a slanting plane and has a flapdoor type gate 5 which is pivoted on a shaft 6 fixed with respect to the hopper 1 as shown. The gate 5 constitutes a lever mechanism having its fulcrum at the shaft 6 and its distal end coupled through a connecting rod 7 to a second arm 8b of a bell crank 8 pivoted on a horizontal shaft 9 which is fixed to the hopper 1 parallel to the shaft 6. The bell crank 8 has a first arm 8a whose end faces a plunger of air cylinder 10 which moves uniformly to rotate the bell crank 8 when actuated. A coil spring 11 is stretched between the second arm 8b of the bell crank 8 and the hopper 1 to urge the gate always to its closed state, and a stop 12 is provided on the hopper 1 for confining the bell crank 8 to this state.

In operation, the air cylinder 10 is actuated to push the arm 8a of the bell crank 8 and rotate it in counter-clockwise direction against the tension of the spring 11. This rotation is transferred through the connecting rod 7 to the gate 5 to open it as shown in phantom in the drawing. When the air cylinder 10 is de-actuated, the bell crank 8 is pulled back to the original position by the spring 11 and the gate 5 is closed.

In this prior art gate driving device, however, when the gate 5 is opened, it is abruptly decelerated at the end of the advance (stroke) of the plunger of air cylinder 10 to cause overshoot of the gate 5 which involves unwanted time loss and gives undesirable vibration to the hopper 1 and weighing unit 4. The time loss and vibration and resultant accuracy reduction cause a severe problem when the gate is opened and closed at high speed in order to shorten the cycle time of automatic weighing operation.

Next, the present invention will be described with reference to the embodiments as shown in FIGS. 2 through 6. The first embodiment of FIG. 2 differs from the prior art device of FIG. 1 in that for the connecting rod 7 is substituted a first connecting rod 22, a second bell crank 20 having first and second arms 20a 20b and pivoted on a horizontal shaft 26, and a second connecting rod 24, and in that the gate 5 is pivoted on a horizontal shaft 28 at its one end. The shafts 9, 26 and 28 are arranged mutually in parallel and fixed with respect to the hopper 1. The second arm 8b of the first bell crank 8 is coupled through the first connecting rod 22 to the first arm 20a of the second bell crank 20 and the second arm 20b of the second bell crank 20 is coupled through the second connecting rod 24 to an intermediate point of the gate 5. It is essential that the geometries and locations of the bell cranks and connecting rods are designed such that the second arm 8b of the first bell crank 8 and the first connecting rod 22 lie on a straight line, as shown in solid lines in the drawing, when the gate 5 is closed, and the second arm 20b of the second bell crank 20 and the second connecting rod 24 lie on another straight line, as shown in phantom in the drawing, when the gate 5 is in an open state. In other words, the first bell crank 8 is at its upper dead point (upper dead center) when the gate 5 is in its closed state, while the second bell crank 20 is its upper dead point (upper dead center) when the gate 5 is in its open state.

Figure 3:
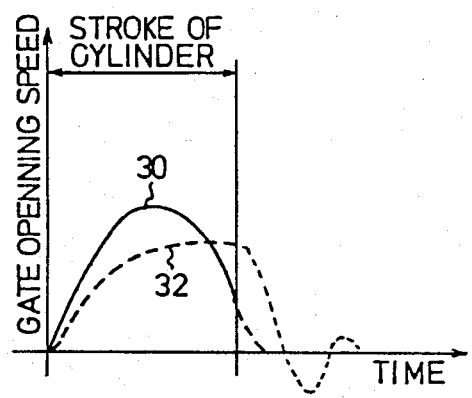
FIG. 3 is a graph showing gate opening speed varying with time in comparison of the devices of FIGS. 1 and 2.
Figure 4:
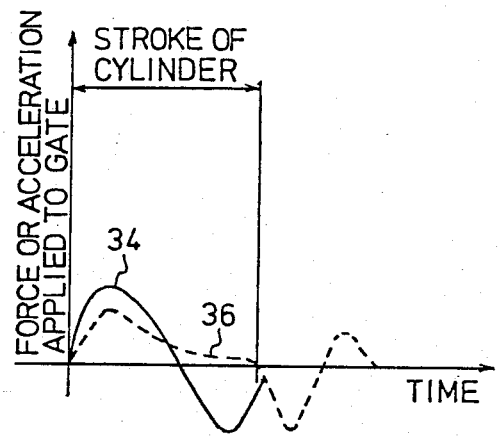
FIG. 4 is a graph showing force or acceleration applied to the gate with respect to time in comparison of the devices of FIGS. 1 and 2.

In operation, when the air cylinder 10 is actuated, its plunger moves forward at uniform speed to push the first arm 8a of the bell crank 8 to rotate the crank 8 in counterclockwise direction against the tension of the spring 11. The results in counterclockwise rotation of the second bell crank 20 through the connecting rod 22. The rotation of the bell crank 20 is transmitted through the second connecting rod 24 to the gate 5 and the gate 5 begins to open. Then, the gate opening speed increases along Curve 30 in FIG. 3 as the crank 8 moves away from its upper dead point and reaches its maximum in the midway, and, thereafter, it reduces along Curve 30 as the second bell crank 20 draws near its upper dead point and becomes about zero at the end of the stroke of the air cylinder 10. The dashed curve 32 gives similar speed variation in the prior art device as shown in FIG. 1 for comparison. As clearly seen from this comparison, the speed of gate 5 at the end of opening is substantially lower in the present invention. FIG. 4 shows variation of the force or acceleration to which the gate is subjected during the same gate opening process by solid and dashed curves 34 and 36 in the same manner as FIG. 3. When the plunger of air cylinder 10 comes back at uniform speed from the stroke end, the speed and acceleration of the gate follow curves similar to those of FIGS. 3 and 4.

Figure 2:
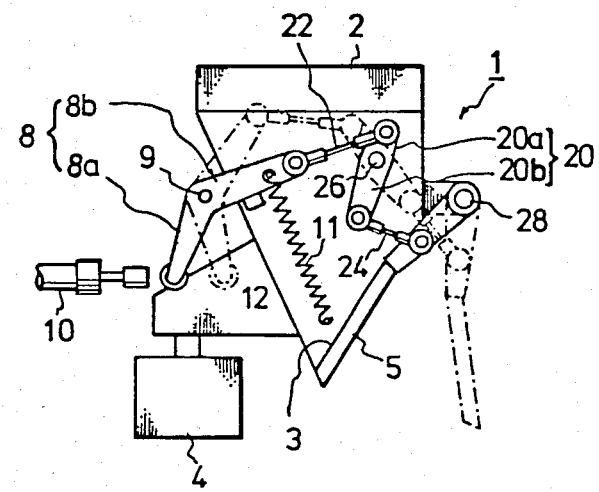
FIG. 2 is a side view representing an embodiment of gate driving device according to this invention.
Figure 5:
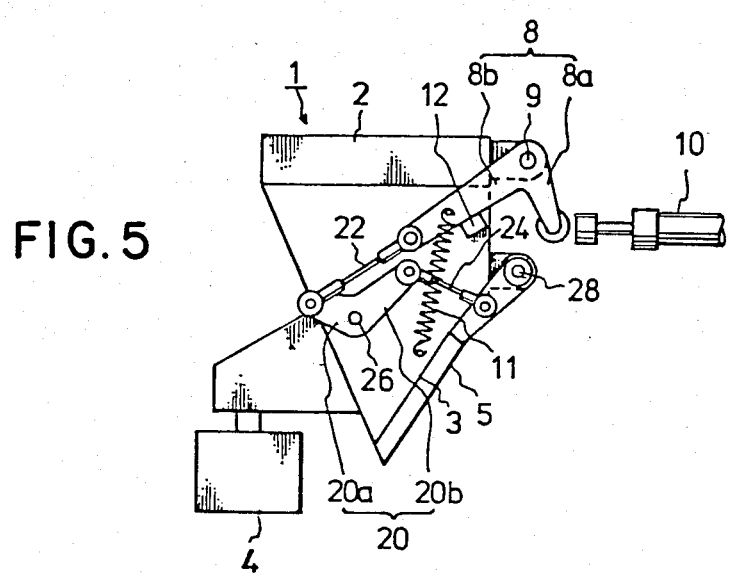
FIG. 5 is a side view representing another embodiment of gate driving device according to this invention, in which the gate is closed.
Figure 6:
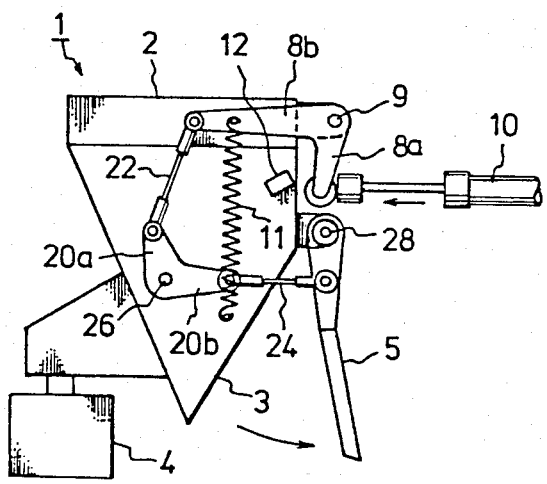
FIG. 6 is a side view of the embodiment of FIG. 5, showing the gate opened.

The second embodiment as shown in FIGS. 5 and 6 is somewhat different in the arrangement of bell cranks and connecting rods from the embodiment of FIG. 2. However, it should be readily understood by reviewing these drawings that both are quite same in principle and operation.

As described above, in the device of this invention, either of the first and second bell cranks 8 and 20 is put in its upper dead point when the gate 5 is in its opened or closed state. Therefore, there will be almost no overshoot of the gate at the both stroke ends. Moreover, as shown in FIGS. 3 and 4, speed and acceleration of the gate at the stroke ends are almost zero and, therefore, the gate will impart little shock and vibration to the weighing unit 4.

I claim:

1. In a hopper having a discharge opening at the bottom, said opening being provided with a flapdoor type gate; a gate driving device comprising a first bell crank having first and second arms and pivoted on a horizontal axis for receiving original driving force applied to said first arm, a second bell crank having first and second arms and pivoted on another horizontal axis, a first connecting rod for connecting the second arm of said first bell crank to the first arm of said second bell crank, a second connecting rod for connecting the second arm of said second bell crank to said gate; characterized in that the locations and geometries of said bell cranks and connecting rods are selected such that, when said gate is in closed state, the second arm of said first bell crank and said first connecting rod align on a straight line, and that, when said gate is in open state, thhe second arm of said second bell crank and said second connecting rod align on another straight line.

2. The gate driving device, according to claim 1, characterized in that said device further comprises means for driving the first arm of said first bell crank at uniform speed.

3. A hopper having a discharge opening at the bottom, a gate for the opening swingable between a closed and an open position, and means for driving the gate comprising a first lever pivoted on a first horizontal axis and a second lever pivoted on a second horizontal axis, a first link interconnecting the levers pivotally interconnected with the first lever at a first point and with the second lever at a second point and a second link pivotally interconnected with the second lever at a third point and with the gate at a fourth point, the first lever, when swung in one direction, being operable via the first link, the second lever and the second link to swing the gate to open position, and, when swung in the opposite direction, being operable via the first link, the second lever and the second link to swing the gate to closed position, the geometry of the levers and links being such that when the gate is in closed position the pivot axis of the first lever and said first and second points are substantially aligned, and when the gate is in open position, the pivot axis of the second lever and said third and fourth points are substantially aligned.

4. A hopper having a discharge opening at the bottom, a gate for the opening swingable between a closed and an open position, and means for driving the gate comprising first lever means comprising a first horizontal pivot axis and a second lever means comprising a second horizontal pivot axis, a first link interconnecting the lever means pivotally interconnected with the first lever means at a first point and with the second lever means at a second point and a second link pivotally interconnected with the second lever means at a third point and with the gate at a fourth point, the first lever means, when swung in one direction, being operable via the first link, the second lever means and the second link to swing the gate to open position, and, when swung in the opposite direction, being operable via the first link, the second lever means and the second link to swing the gate to closed position, the geometry of the lever means and links being such that when the gate is in closed position said first pivot axis and said first and second points are substantially aligned, and when the gate is in open position, said second pivot axis and said third and fourth points are substantially aligned.

* * * * *